UNITED STATES PATENT OFFICE.

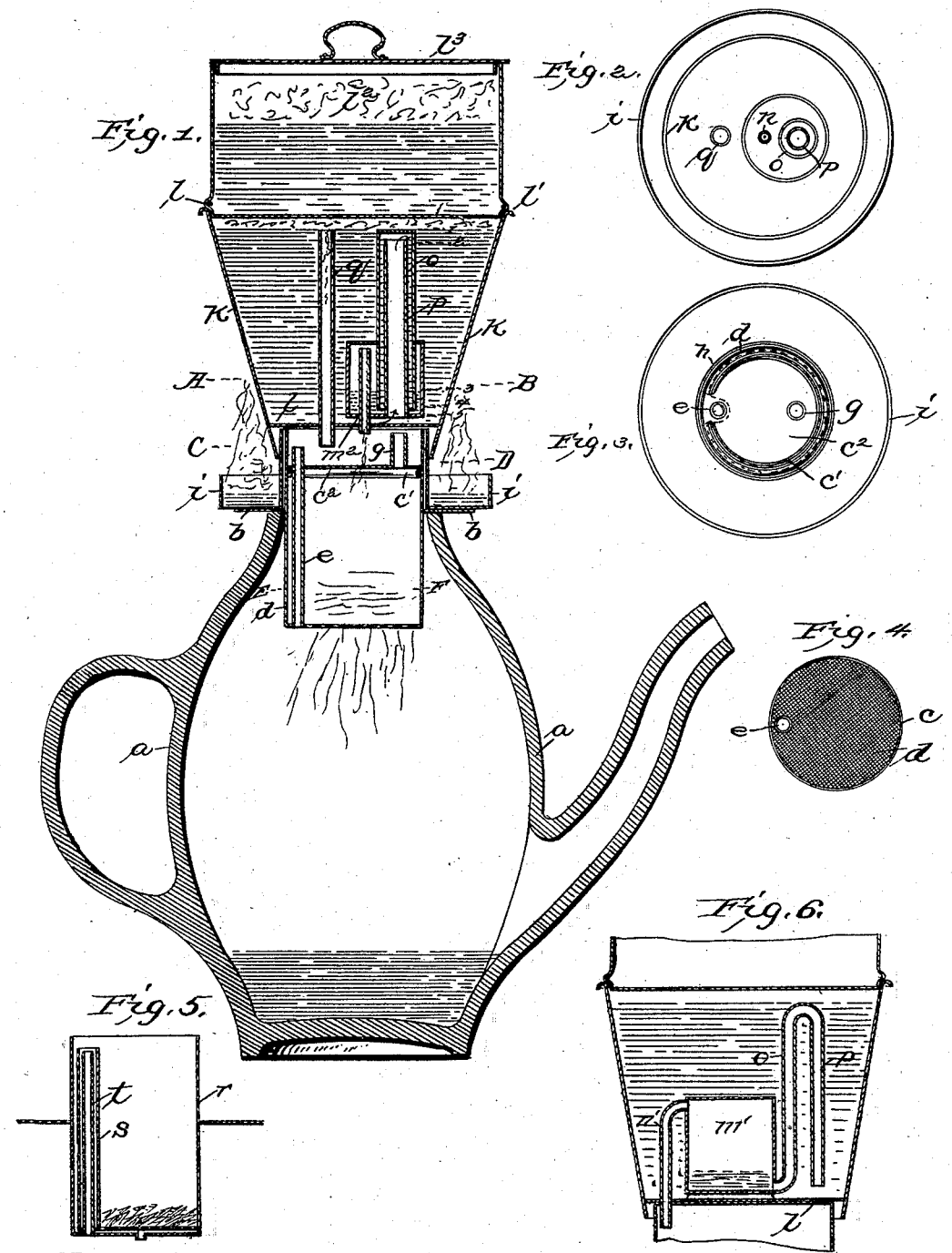

WARNERUS BORCHERS, OF MUNICH, GERMANY.

COFFEE-MACHINE.

SPECIFICATION forming part of Letters Patent No. 578,910, dated March 16, 1897.

Application filed April 5, 1895. Serial No. 544,634. (Model.)

*To all whom it may concern:*

Be it known that I, WARNERUS BORCHERS, a citizen of Germany, and a resident of Munich, Bavaria, Germany, have invented certain new and useful Improvements in Coffee-Machines, of which the following is a specification.

The object of my invention is to provide a coffee or tea making apparatus which will operate automatically to discharge a volume of boiling water through the coffee or tea, the extract being caught by a suitable vessel.

My invention involves a siphon action and becomes operative and works automatically after the flame which is used to make the water boil is extinguished, and by which the condensation is allowed to take place, placing the siphon in operation.

In the drawings, Figure 1 is a vertical section; Fig. 2, a horizontal section on line A B of Fig. 1; Fig. 3, a section on line C D of Fig. 1, and Fig. 4 on line E F. Fig. 5 shows a part used in making tea. Fig. 6 shows a modification.

The coffee or tea pot A is of ordinary form and receives a cylinder $d$, provided with a flange $b$ and having an open top and a sieve at the bottom for holding the ground coffee. An overflow-tube $e$ is arranged in the cylinder $d$. A collar $c'$ in the cylinder $d$ supports a disk $c$, which carries a short tube $g$. $i$ is a pan for containing alcohol, and this is secured to a cylinder $h$, fitting over the cylinder $d$. Above the alcohol-pan and its cylinder $h$ a conical boiler $k$ is placed with its bottom resting upon the cylinder $h$. This boiler is open at its top and receives a milk-receptacle $l^2$, having a packing-ring $l'$, which forms a steam-tight closure for the boiler. The vessel $l^2$ has a cover $l^3$. Within the boiler there is a chamber $m$, having an outlet-tube $n$, reaching to near the top thereof, and it has a tube $p$ extending through it open at the bottom to the boiler $k$ and at the top within an inverted tube $o$, closed at the top and open at the bottom to the chamber $m$. The upper end of the tube $o$ is on a level with a tube $q$, extending through the boiler $k$, opening into the same at its upper end and opening into the chamber or cylinder $d$ at its lower end for the escape of excess of steam from the boiler $k$ to the said cylinder. This arrangement makes the upper end of the tube $p$ slightly below the top of the overflow-tube $q$ and provides a space above the tube $p$ and below the upper closed end of the tube $o$.

In operating the apparatus the boiler $k$ is first filled with water until it commences to run out of the tube $q$, and at this time the water will flow over the top of the tube $p$, down through the annular space between the tubes $o$ and $p$, filling the chamber $m$, and finally passing out of the tube $n$, the air being driven from the chamber $m$ upon the entrance of the water. The purpose is to provide a quantity of water in the chamber $m$ and to provide a volume of compressed air in the small space at the top of the tube $p$. For this purpose the boiler $k$ is tilted until the water runs therefrom entirely and until it also runs from the tube $p$, thus allowing the air to enter the tube $p$; but in this action the water cannot be discharged from the chamber $m$. Upon setting the boiler $k$ upright again and filling it the water will rise in the tube $p$, driving the air before it and compressing a column of air in the small space at the top of the tube $p$, which will thus keep separate the column of water in the tube $p$ and that in the annular space between $o$ and $p$, which is connected with chamber $m$. This compressed air will hold these columns in balance and separate from each other, and as long as this compressed air is maintained there will be no automatic action of the apparatus. In order to destroy this balance, it is only necessary to light the alcohol in the pan $i$, whereupon the water will boil and the steam will fill the compressed-air space, driving the compressed air therefrom, and will fill also the space at the upper surface of the water in the boiler. The same equilibrium will be preserved—that is, a volume of steam in the small intermediate space will keep the water column in the tube $p$ from joining that in the tube $o$ so long as the flame continues, but upon the cessation of this flame condensation of the steam will take place in the small intermediate space, and the water in the tube $p$ will immediately join that in the annular space and the siphon action will begin and will continue until practically all the boiling water has been discharged from the boiler $k$ by way of the tube $p$, tube $o$, chamber $m$, and pipe $n$.

In Fig. 6 a modification is shown in which the two pipes $o'$ $p'$ are in the form of a gooseneck having the compressed-air space at their joined upper ends, the lower end of the tube $o'$ connecting with the lower part of a chamber $m'$, while the discharge $n'$ extends from the upper part of the chamber $m'$. In order to adapt the apparatus for making tea, a simple cylinder is used, such as is shown in Fig. 5, having an open upper end, a lower sieve, and small pipe $t$, open at both ends and surrounded by a large pipe $s$, connecting with the sieve-plate at its lower end. This cylinder merely replaces the cylinder $d$ heretofore described.

I claim as my invention—

1. An apparatus for making coffee or the like, consisting of a boiler and a siphon connection leading therefrom, comprising a chamber $m$ with a discharge-tube and tubes $o$, $p$, leading thereto having an intermediate space for compressed air at their upper ends, substantially as described.

2. In combination, a cylinder $d$ having a flange to rest upon the coffee-pot, an alcohol-pan with an upwardly-extending ring or cylinder $k$ to fit about the cylinder $d$, and a boiler above the pan having flaring sides and having a siphoning connection between itself and the cylinder $d$, substantially as described.

3. In combination, the cylinder $d$ adapted to fit into the coffee-pot and having a sieve and an overflow-tube $e$, a water-boiler above the cylinder $d$ and a siphon connection between the water-boiler and the cylinder $d$, substantially as described.

4. In combination in an apparatus for making coffee or the like, a boiler and a siphon connection leading therefrom comprising a chamber $m$, an outlet-tube therefrom, and a pair of tubes $o$, $p$, forming the connection between the boiler and chamber $m$, one of said tubes being closed at its upper end with an air-space between it and the upper end of the other tube and one of the said tubes having an open lower end connecting with the interior of the boiler.

In testimony that I claim the foregoing as my invention I have signed my name in presence of two subscribing witnesses.

WARNERUS BORCHERS.

Witnesses:
EMIL HENZEL,
ALBERT WEICKMANN.